United States Patent
Ellis

[15] 3,699,876
[45] Oct. 24, 1972

[54] COMBINED CHARCOAL GRILL AND PIT BARBECUE COOKER

[72] Inventor: Clarence E. Ellis, 724 Monument Road, Ponca City, Okla.

[22] Filed: Aug. 9, 1971

[21] Appl. No.: 170,041

[52] U.S. Cl. ................................... 99/259, 126/25 R
[51] Int. Cl. ........................... A47j 37/00, A24b 3/00
[58] Field of Search ........... 126/25 R, 25 A, 14, 59.5; 99/259, 260

[56] References Cited

UNITED STATES PATENTS

| | | | |
|---|---|---|---|
| 2,072,364 | 3/1937 | Gray et al. ................. | 99/259 X |
| 2,666,425 | 1/1954 | Hastings, Jr. ............... | 126/25 R |
| 2,842,043 | 7/1958 | Reuland ..................... | 99/259 |
| 3,644,124 | 2/1972 | Bedsole ..................... | 99/260 X |

FOREIGN PATENTS OR APPLICATIONS 162,080    2/1958    Sweden ...................... 99/259

*Primary Examiner*—Charles J. Myhre
*Attorney*—Lawrence L. Colbert

[57] ABSTRACT

A common casing encloses an ash pit and grate for a pit-type barbecue cooker and an overhead pan for drippings or for the support of charcoal when the device is utilized as an outdoor charcoal grill. An adjustable grill rack is mounted in the casing above the pan and an adjustable stack with damper in the top of the casing allows smoke from a wood fire to be circulated across food on the grill rack.

7 Claims, 4 Drawing Figures

PATENTED OCT 24 1972                                    3,699,876

3,699,876

COMBINED CHARCOAL GRILL AND PIT BARBECUE COOKER

Numerous teachings pertaining to outdoor charcoal grills, ovens and cookers are present in the prior art. Notably absent in the known prior art is the provision of a device which is readily convertible from a pit-type cooker to a charcoal grill without structural modification. Such a device should be highly useful and attractive to the devotees of outdoor cooking and the device is very economical in construction, compact and easy to use.

Accordingly, it is the object of the invention to provide a combination outdoor charcoal grill and pit barbecue cooker of simplified and economical construction, and which can be converted to either use quickly and without any basic rearrangement of internal parts.

Another object is to provide means on such a cooker for directing smoke from a wood fire over and around meat or other food items on a grill rack when the cooker is in use as a pit-type barbecue.

Other objects and advantages of the invention will become apparent during the course of the following detailed description.

BRIEF DESCRIPTION OF DRAWING FIGURES

DETAILED DESCRIPTION

Figure 1:
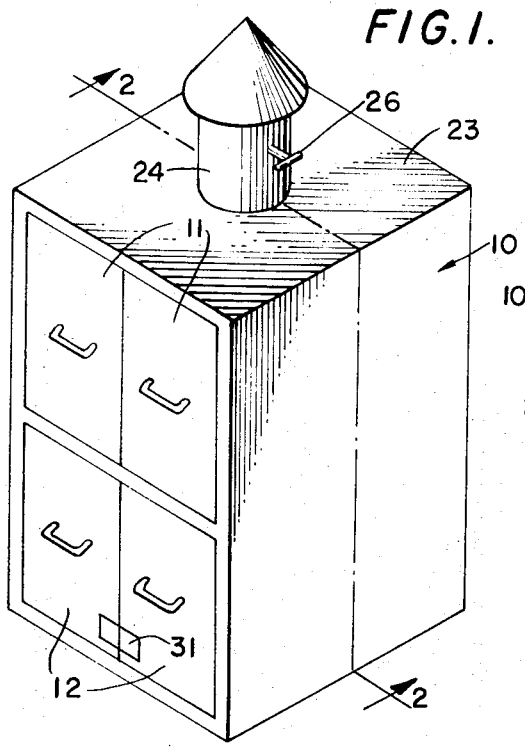
FIG. 1 is a perspective view of a combination charcoal grill and pit barbecue embodying the invention.

Referring to the drawings in detail wherein like numerals designate like parts, the numeral 10 designates an exterior rectangular body portion or casing which may be equipped with suitable exterior insulation, not shown. The forward vertical side of the rectangular casing preferably has upper and lower pairs of outwardly opening doors 11 and 12, mounted on vertical axis hinges at their outer sides. The general construction of the casing and doors may be conventional.

Mounted at a fixed elevation in the lower portion of the casing 10 is a grate 13 for suitable fire wood 14, the grate being formed by a row of spaced parallel bars lying in a common horizontal plane. An ash pit 15 is formed in the extreme bottom of the casing 10 beneath the grate 13.

Figure 2:
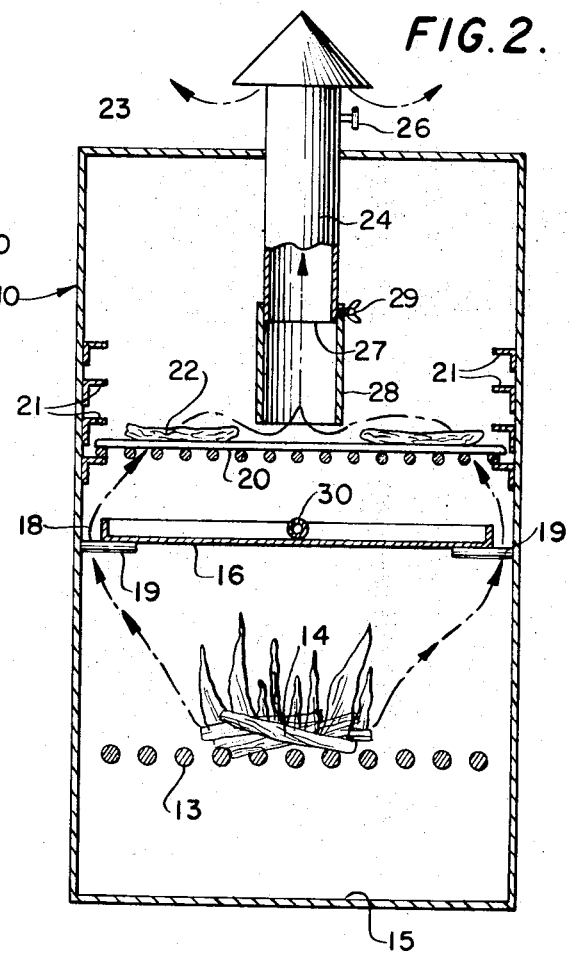
FIG. 2 is a central vertical section taken on line 2—2 of FIG. 1.
Figure 3:
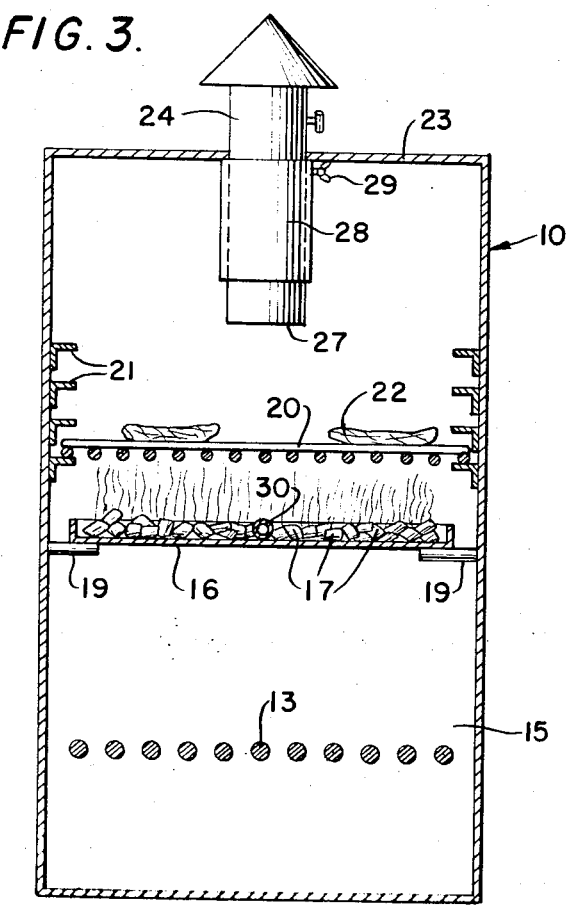
FIG. 3 is a view similar to FIG. 2 showing the use of the invention as a charcoal grill, FIG. 2 depicting usage as a pit barbecue.
Figure 4:
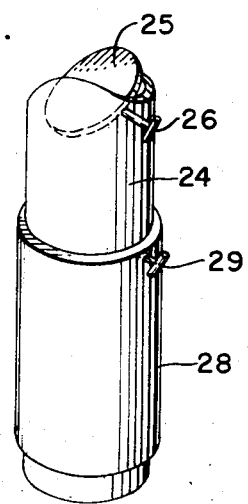
FIG. 4 is a fragmentary perspective view of a chimney mounted damper and draft sleeve.

Well above the grate 13 at a fixed elevation near the vertical center of the casing 10 is a shallow rectangular pan or tray 16 for the dual purpose of collecting grease drippings from above and for supporting charcoal 17 when the invention is utilized as a regular outdoor charcoal grill, FIG. 3, as distinguished from a pit-type cooker, FIG. 2. The pan 16 spans most of the width of the casing 10 but allows a marginal passage 18 on at least two sides of the pan for the upward passage of smoke from the wood fire on the grate 13 during use as a pit cooker. The pan 16 is removably supported on suitable pins or brackets 19 within the main casing.

Above the pan 16 and in the upper portion of the casing 10, a food grill element or rack 20 is adjustably and removably supported on vertically spaced pairs of rails 21, fixedly mounted at different elevations in the casing. The number of these grill supporting rails may be varied. The grill or rack 20 is formed of spaced rods or wire elements and may be conventional in construction. Steaks 22 or other suitable food items are placed directly upon the rack 20 when the invention is in operation in either manner as shown by FIGS. 2 and 3.

Centrally disposed fixedly in the top wall 23 of casing 10 is a chimney or stack 24 having an adjustable damper plate 25 mounted therein and equipped with a handle 26. This chimney 24 extends above and below the top wall 23 and has its lower end 27 terminating at a fixed predetermined distance above the bottom of the housing and well within the upper chamber portion of the housing. A vertically adjustable extension sleeve 28 is mounted telescopically over the chimney 24 and is lockable in a selected vertically adjusted position by a set screw 29 on the extension sleeve. The arrangement is such that the lower end of the sleeve 28 may be positioned close to the rack 20 and well below the lower end 27 of the chimney, FIG. 2, or above such lower end and clear of the rack 20, FIG. 3.

A suitable drain pipe 30 for drippings leads from the pan 16 through the rear of the casing 10 to a collection point.

If desired, the unit may be equipped with a thermostatic regulator means 31 for the damper plate 25 which has a manual override through the handle 26. The thermostatic control means responsive to temperature in the unit chamber may be of a conventional type. This is an optional feature of the invention which can be omitted in some cases for simplicity. The feature is generally employed during barbecue operation, FIG. 2, to regulate the draft in the fire chamber immediately above the grate 13.

When the device is used as a pit barbecue, FIG. 2, a wood fire is maintained on the grate 13 and the damper plate 25 is suitably adjusted to draw smoke upwardly and around the pan 16 and over and across the food 22 on the grill or rack 20. The extension sleeve 28 is in a down position at this time to cause the smoke to pass horizontally over the food on the rack 20 before ascending into the chimney. Liquid drippings caused by cooking are collected on the pan 16 and may be drained through the pipe 30. The rack 20 may be set at any desired height utilizing the rails 21 and making corresponding adjustment of the sleeve 28.

When the device is used as a charcoal grill, FIG. 3, the sleeve 28 is elevated and locked in this position by the set screw 29. Charcoals are placed in the pan 16 and ignited and the rack 20 is placed at the desired elevation on the rails 21 and the damper plate 25 is set at the most advantageous adjustment. At this time, no fire is utilized on the grate 13.

It may be clearly understood in light of the above description that the device is easily and quickly converted from a regular charcoal grill to a pit-type barbecue cooker without any basic rearrangement of parts or structural modifications, and only by a repositioning of the sleeve 28 and rearrangement of the heat source either on the grate 13, FIG. 2, or in the pan 16, FIG. 3. The simplicity, economy of construction, versatility and ease of operation of the invention is apparent without further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A combination charcoal grill and pit barbecue cooker comprising a casing body portion having a bottom forming an ash pit, a grate structure for supporting fire wood immediately above said ash pit in the casing body portion, a shallow pan for charcoals and food drippings removably supported in the casing body portion at a fixed elevation above the grate structure, there being a smoke passage between margins of said pan and side walls of the casing body portion, a vertically adjustable food rack within the casing body portion above said pan, a chimney mounted centrally on top of the casing body portion and projecting downwardly into the upper portion of the casing body portion, and a vertically adjustable and lockable extension sleeve on the chimney and being movable relative to the food rack so that smoke from a wood fire on the grate structure can be drawn around and horizontally over food items on said rack.

2. The structure of claim 1, and an adjustable damper plate on the chimney above the extension sleeve, the extension sleeve mounted telescopically on the chimney, and a set screw on the extension sleeve for locking the latter at selected elevations on the chimney.

3. The structure of claim 1, and said shallow pan disposed near the vertical center of the casing body portion, and fixed support elements on side walls of the casing body portion supporting said pan removably.

4. The structure of claim 1, and said vertically adjustable food rack comprising a substantially horizontal open mesh rack, and plural elevation side support rails for said rack within the casing body portion above said pan.

5. The structure of claim 1, and said casing body portion having an open forward side, and hinged door closure means on the casing body portion adapted to cover said open side.

6. The structure of claim 2, and thermostatic regulator means for said damper plate on the casing body portion, said damper plate also having a manual adjusting handle exteriorly of the chimney.

7. The structure of claim 1, and said grate structure comprising a series of parallel spaced grate bars disposed in a common horizontal plane fixedly near and above the bottom wall of the casing body portion.

* * * * *